(12) United States Patent
Kobayashi et al.

(10) Patent No.: US 7,327,662 B2
(45) Date of Patent: Feb. 5, 2008

(54) OPTICAL PICKUP AND OPTICAL DISK DRIVE

(75) Inventors: Takashi Kobayashi, Kanagawa (JP); Tadashi Taniguchi, Kanagawa (JP)

(73) Assignee: Sony Corporation, Tokyo (JP)

(*) Notice: Subject to any disclaimer, the term of this patent is extended or adjusted under 35 U.S.C. 154(b) by 527 days.

(21) Appl. No.: 10/807,241

(22) Filed: Mar. 24, 2004

(65) Prior Publication Data

US 2004/0240370 A1    Dec. 2, 2004

(30) Foreign Application Priority Data

Mar. 28, 2003   (JP) .............................. 2003-092346

(51) Int. Cl.
*G11B 7/00*   (2006.01)
(52) U.S. Cl. ................. 369/112.05; 369/53.2
(58) Field of Classification Search ............. None
See application file for complete search history.

(56) References Cited

U.S. PATENT DOCUMENTS

| | | | | |
|---|---|---|---|---|
| 4,703,408 A | * | 10/1987 | Yonezawa et al. | 369/44.13 |
| 5,511,050 A | * | 4/1996 | Matsumoto et al. | 369/44.23 |
| 5,513,158 A | * | 4/1996 | Ohsato | 369/44.23 |
| 5,526,336 A | * | 6/1996 | Park et al. | 369/94 |
| 6,167,017 A | * | 12/2000 | Higashiura et al. | 369/44.23 |
| 6,628,599 B2 | * | 9/2003 | Maeda et al. | 369/112.01 |
| 6,738,324 B2 | * | 5/2004 | Saimi et al. | 369/44.37 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

A diffraction element is interposed between a semiconductor laser and collimator lens. Other diffracted light than zero-order light output from the diffraction element will not be focused on an optical recording medium and the amount of light condensed to the focus of the zero-order light is thus smaller. The diffraction element is variable in diffraction efficiency. When the diffraction efficiency of the diffraction element is raised, an optical pickup device will utilize the light with a lower efficiency. With the diffraction efficiency being lowered, the optical pickup device will utilize the light with a higher efficiency. Thus, the optical pickup device can utilize the light with a variable efficiency without having to being designed larger.

23 Claims, 7 Drawing Sheets

OPTICAL PICKUP AND OPTICAL DISK DRIVE

BACKGROUND OF THE INVENTION

1. Field of the Invention

The present invention relates to an optical pickup device that writes and reads signals to and from an optical recording medium by irradiating light to the recording medium, and an optical disk drive that drives the optical pickup device.

This application claims the priority of the Japanese Patent Application No. 2003-092346 filed on Mar. 28, 2003, the entirety of which is incorporated by reference herein.

2. Description of the Related Art

The optical pickup device irradiates light to an optical recording medium, and detects return light from the optical recording medium. FIG. 1 schematically illustrates the optical system of a conventional optical pickup device. The optical pickup device is generally indicated with a reference 90. As shown, it includes a semiconductor laser 91 as a light source, an objective lens 93 that focuses light from the semiconductor laser 91 on an optical recording medium 10, a photodetector 97 that detects return light from the optical recording medium 10, etc.

The above optical pickup device 90 is built in an optical disk drive, and writes signals to the optical recording medium 10 and reads signals recorded in the optical recording medium 10.

In the optical disk drive, the optical output from the semiconductor laser used as a light emitting element, for example, has to be varied depending upon whether information signals are to be read from an optical recording medium or written to the latter. Also, the optical output has to be varied depending upon the type of an optical recording medium used, multilayer type or high-speed read/write type, and the read/write speed of the optical recording medium used, high, medium or low.

Normally, for determination of an efficiency with which light emitted from a semiconductor laser is to arrive at an optical recording medium (the efficiency will also be referred to as "efficiency of light utilization" hereunder wherever appropriate), the semiconductor laser is first set for an optical output of 3 mW or more. If the optical output of the semiconductor laser is less than 3 mW, the laser noise of the semiconductor laser will increase drastically to degrade the quality of signals read from the optical recording medium. On the other hand, the intensity of light arriving at an optical recording medium will depend upon the characteristic of the optical recording medium. It is 0.3 mW, for example. In an optical pickup device using the above-mentioned semiconductor laser and optical recording medium, when the semiconductor laser is set for an efficiency of light utilization of 10%, the semiconductor laser provides an optical output of 3 mW and the light arriving at the optical recording medium has an intensity of 0.3 mW for reading from the optical recording medium. For writing to the optical recording medium, the intensity of light arriving at the optical recording medium also depends upon the characteristic of the optical recording medium. For example, for an optical recording medium needing a light intensity of 0.3 mW for reading and a light intensity 10 times higher than that for reading, the light intensity required for writing to the optical recording medium is 3 mW. At this time, the semiconductor laser has to provide an optical output of 30 mW for writing to the optical recording medium. On the assumption that the optical recording medium is of a single-layer, normal-speed type, the semiconductor laser has to provide an optical output of 60 mW for a light intensity of 6 mW, for example, required for writing to a two-layer optical recording medium. Further, on the assumption that the optical recording medium is of a two-layer, double-speed type, the semiconductor laser has to provide an optical output of 120 mW for a light intensity of 12 mW required for writing to a two-laser optical recording medium.

For writing signals to such various types of optical recording media, the semiconductor laser has to provide a higher output. However, such a higher semiconductor laser output will bring about a lower reliability, edge breakdown, shorter life, etc. of the semiconductor laser. Further, the semiconductor laser will consume more power and run a higher temperature.

To solve the above problems, it has been proposed to use an attenuator. For reading signals from the above-mentioned optical recording medium with the semiconductor laser being set for an efficiency of light utilization of 20%, for example, the attenuator is activated to halve the necessary light intensity. Thus, the attenuator enables recording with a half of the semiconductor laser output.

There have been proposed attenuators using a liquid crystal or diffraction element. In the attenuator using a diffraction element, for example, zero-order light is attenuated by making a light intensity modulation of diffraction efficiency by the diffraction element and shielding the diffracted (cf. the Japanese Patent Application Laid-Open No. H09-223328).

Also, it has been proposed to attenuate the zero-order light by a light intensity modulation of the diffraction efficiency by the diffraction element and varying the ratio in light amount between ±first-order light used for detection, by three beams, of servo signals and the zero-order light used for detection of return light from the optical recording medium (cf. the Japanese Patent Application Laid-Open No. 2002-90784, for example). This method is different from the light attenuation for reading and writing.

In the above method disclosed in the Japanese Patent Application Laid-Open No. H09-223328, however, to shield the diffracted light, the diffraction angle has to be increased or the aperture provided on the objective lens and the diffraction element have to be spaced sufficiently from each other. For a sufficiently large diffraction angle, the diffraction-grating interval has to be increased sufficiently, which will lead to a difficulty in making the diffraction element. Also, for an increased distance between the aperture on the objective lens and the diffraction element, the optical pickup device has to be designed larger.

On the other hand, the method disclosed in Japanese Patent Application Laid-Open No. 2002-40784 has such a problem that increasing the intensity of the ±first-order light to over that of the zero-order light results in erasure of signals recorded in the optical recording medium because since the modulated diffracted light is used to detect light. Also, since the ±first-order light returning to the photodetector varies in intensity as well, the photodetector has to have the detectivity range thereof increased.

Also, an optical attenuator using a liquid crystal has been proposed. In this attenuator, the polarized direction of light passing through the liquid crystal is modulated to control the amount of light passing through a polarizing beam splitter provided downstream of the liquid crystal. However, this element has to be provided in parallel light. Insertion of the element in the parallel light will cause the element itself to be larger than that element inserted in divergent light. Also, in a small optical pickup device using an optical lens commonly for both collimation of light emitted from a semiconductor laser and condensation of the light to a photodetector, the coming light and going light will pass through the attenuator, which will result in attenuation of the light focused to the photodetector.

OBJECT AND SUMMARY OF THE INVENTION

It is therefore an object of the present invention to overcome the above-mentioned drawbacks of the related art by providing an optical pickup device capable of varying the efficiency of light utilization without increasing the scale of the device itself, and also an optical disk drive that drives the optical pickup device.

The above object can be attained by providing an optical pickup device including, according to the present invention, a light source that irradiates light to an optical recording medium; a focusing means for focusing the light emitted from the light source on the optical recording medium; a diffraction means provided between the light source and focusing means to diffract the light emitted from the light source so that zero-order light resulted from the diffraction is focused by the focusing means on the optical recording medium while other diffracted light than the zero-order light goes to a focus shifted in the optical-axial direction not to be focused on the optical recording medium; and a light detecting means for detecting a portion, reflected from the optical recording medium, of the zero-order light from the diffraction means.

Also the above object can be attained by providing an optical disk drive that writes signals to an optical recording medium and/or reads signals recorded in the optical recording medium, the apparatus including, according to the present invention, a light source that irradiates light to an optical recording medium; a focusing means for focusing the light emitted from the light source on the optical recording medium; a diffraction means provided between the light source and focusing means to diffract the light emitted from the light source so that zero-order light resulted from the diffraction is focused by the focusing means on the optical recording medium while other diffracted light than the zero-order light goes to a focus shifted in the optical-axial direction not to be focused on the optical recording medium; a light detecting means for detecting a portion, reflected from the optical recording medium, of the zero-order light from the diffraction means; and a write/read control means for controlling the output of reading or writing light from the light source and the diffraction efficiency of the diffraction means.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Figure 1:
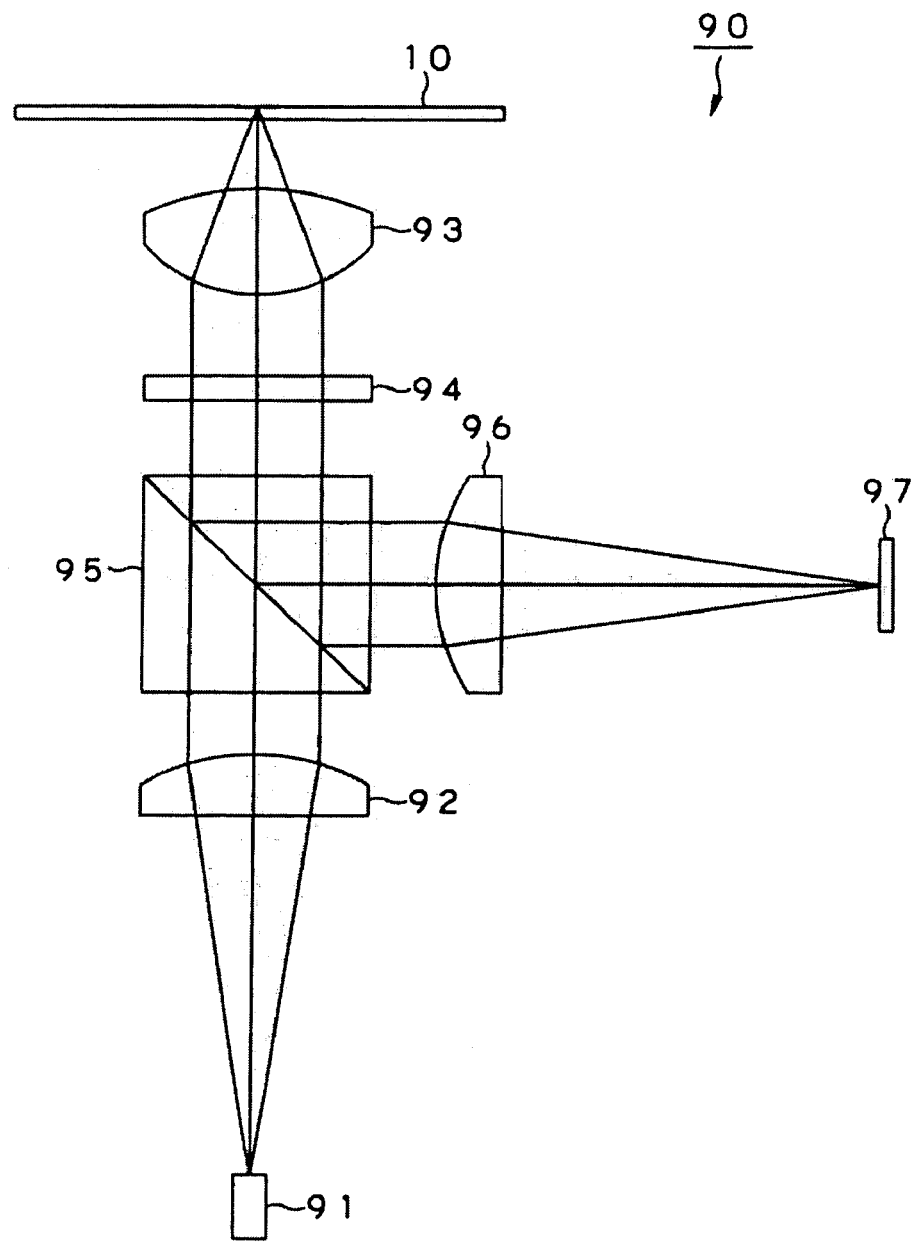
FIG. 1 schematically illustrates the optical system of a conventional optical pickup device.
Figure 2:
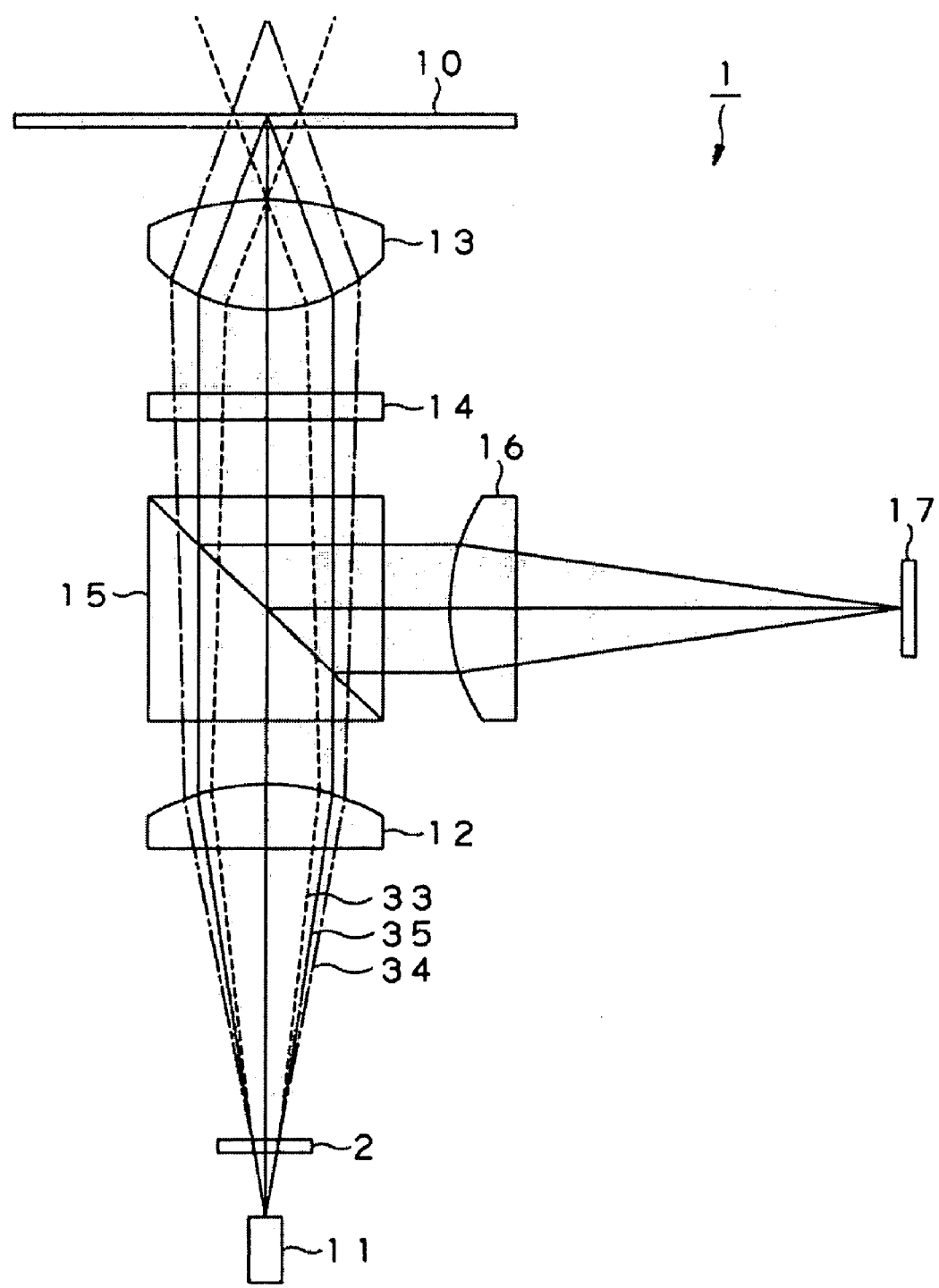
FIG. 2 schematically illustrates the optical system of an optical pickup device using a transmissive diffraction element according to the present invention.

Referring now to FIG. 2, there is schematically illustrated the optical system of the optical pickup device as one of the embodiments of the present invention. The optical pickup device is generally indicated with a reference 1. The optical pickup device 1 is to irradiate light to an optical recording medium 10 and detect return light from the optical recording medium 10. As shown in FIG. 1, the optical pickup device 1 is an optical system including a semiconductor laser 11 as a light source, and a collimation lens 12 and objective lens 13, provided to focus light emitted from the semiconductor laser 11 on the optical recording medium 10.

On the light path to the collimation lens 12 and objective lens 13, there are disposed a λ/4 plate 14 that rotates polarized return light from the optical recording medium 10 and a beam splitter 15 that makes polarization splitting of the light emitted from the light source and return light from the optical recording medium 10. The beam splitter 15 allows the light emitted from the semiconductor laser 11 to pass through and reflects the return light from the objective lens 13 toward a photodetector 17. The return light passing through the beam splitter 15 is condensed by a condenser lens 16 and detected by the photodetector 17.

Also, between the semiconductor laser 11 and collimator lens 12, there is provided a diffraction element 2 whose diffraction efficiency is variable. When the diffraction efficiency is low, the diffraction element 2 will allow all the light emitted from the semiconductor laser 11 to pass by. When the diffraction efficiency is high, the diffraction element 2 will diffract the light emitted from the semiconductor laser 11.

When the diffraction efficiency of the diffraction element 2 is raised, a reduced amount of light will be incident upon the recording layer of the optical recording medium 10. The reason for this fact is that the light allowed to pass directly through the diffraction element 2 will converge on the focus of the objective lens 13 and be focused on the recording layer of the optical recording medium 10, while the light diffracted by the diffraction element 2 will not be focused on the recording layer of the optical recording medium 10.

The optical pickup device 1 according to the present invention uses the diffraction efficiency-variable diffraction element 2 to prevent other diffracted light than zero-order diffracted light from being focused on the recording layer of the optical recording medium 10. Thus, the optical pickup device 1 is characterized in that the recording layer of the optical recording medium 10 can be irradiated with a variable amount of the light emitted from the semiconductor laser 11.

Figure 3:
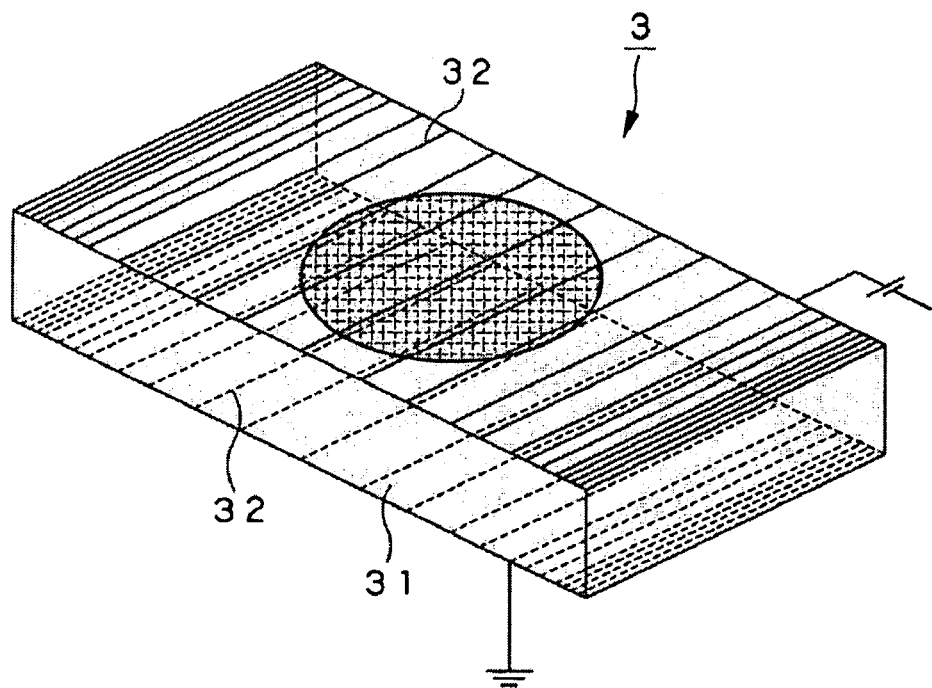
FIG. 3 illustrates a diffraction element using transparent electrodes.

An example of the diffraction element will be described below with reference to FIG. 3. The diffraction element, generally indicated with a reference 3, is an electrochemical optical element formed from a transparent optical material 31 whose refractive index is variable due to an electric field and on which transparent electrodes 32 are additionally provided. In the diffraction element 3, the birefringence of the transparent optical material 31 is varied by applying a voltage across the transparent electrodes 32, to thereby making optical modulation of the diffraction efficiency.

The transparent electrodes 32 are provided in a surface of the transparent optical material 31 perpendicular to the optical axis of the latter. Two transparent electrodes 32 form a pair. One of the transparent electrodes 32 is disposed on a surface of the transparent optical member 31 upon which the light is incident, while the other transparent electrode 32 is disposed on a surface of the transparent optical member 31 from which the light goes out. The transparent electrodes 32 in pair are disposed to be mutually symmetric. When an electric field develops in a position where the transparent electrodes 32 in pair are connected to each other, the diffraction element will work as a diffraction grating.

The light is diffracted in a direction that depends upon the positions of the transparent electrodes 32. In the example of the diffraction element shown in FIG. 3, a plurality of parallel transparent electrodes 32 is provided, and the interval between the adjacent transparent electrodes 32 is narrower as the latter are farther from the optical axis of the transparent optical material 31. With the transparent electrodes 32 being thus disposed, the diffracted light is focused in a position shifted in one axial direction.

The light passing through the above diffraction element 3 travels along light paths as shown in FIG. 2. In FIG. 2, a dotted line 33 indicates a light path along which first-order light travels, a dashed line 34 indicates a light path along which negative first-order light travels, and a solid line 35 indicates a light path along which zero-order light travels. Namely, the zero-order light is focused on the optical recording medium 10, first-order light is focused in a position short of the optical recording medium 10, and the negative first-order light is focused in a position behind the optical recording medium 10, all in a direction perpendicular to the transparent electrodes 32.

As above, the focused position of the zero-order light deviates largely form those of the other diffracted light. Thus, a correspondingly less amount of light will be focused in the focused position of the zero-order light. In the diffraction element 3, its diffraction efficiency is varied, and the ratio of the light arriving at the focused position of the zero-order light is also varied, correspondingly to a change of the voltage applied across the transparent electrodes 32. This fact is utilized in varying the light intensity depending upon whether signals are to be read to or written to the optical recording medium 10.

The variation of light intensity is utilized in combination of the variation of the optical output from the semiconductor laser 11 in practice. In case the optical output from the semiconductor laser 11 for reading signals from the optical recording medium 10 is set to 3 mW and the efficiency of light utilization is to 10%, for example, the intensity of light arriving at the optical recording medium 10 will be 0.3 mW. In case the optical output from the semiconductor laser 11 for reading signals from the optical recording medium 10 is set to 10 mW and the efficiency of light utilization is to 30%, for example, the intensity of light arriving at the optical recording medium 10 will be 3 mW.

Note that according to the present invention, since the zero-order light is focused in a position largely deviated from the focus of the other diffracted light in the optical-axial direction, the light density on the optical recording medium 10 will be sufficiently low even if the diffracted light is higher in intensity than the zero-order light, so that there will be no influence on the read and servo signals and the recorded signals will not be erased by the diffracted light.

Figure 4:
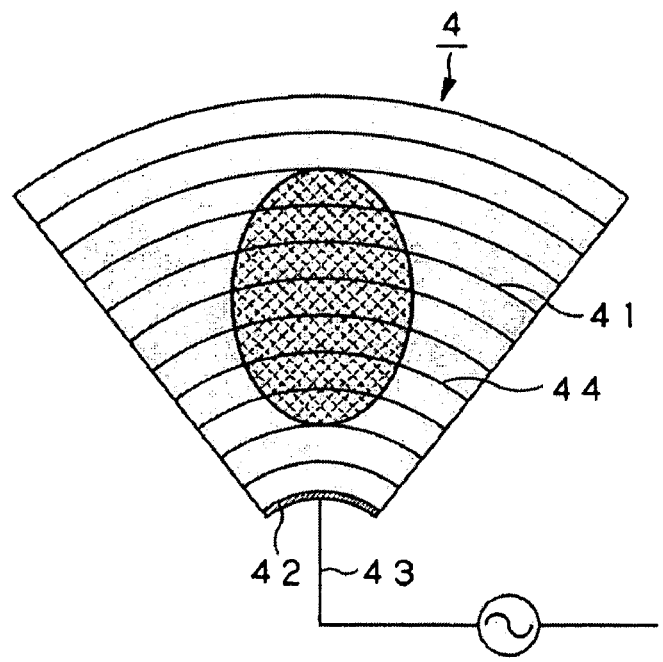
FIG. 4 illustrates a diffraction element using a transducer.

Next, another example of the diffraction element will be described with reference to FIG. 4. The diffraction element, generally indicated with a reference 4, is an acousto-optical element formed from a transparent optical material 41 having a transducer 42 provided in a portion thereof. When a high frequency is applied to an electrode 43, the transducer 42 generates ultrasound. The ultrasound generated by the transducer 42 becomes a stationary wave in the transparent optical material 41 and the stationary wave has different refractive indexes at pressure antinodes and nodes, respectively. A solid line 44 in the transparent optical material 41 indicates a pressure antinode.

The diffraction element 4 provides different kinds of diffracted light depending on the type of the transducer 42 used. The transducer 42 shown in FIG. 4 is curved to have a curvature and generates a spherical wave. The diffracted light from the diffraction element 4 is focused in any other position than on the optical recording medium. Thus, a smaller amount of the light is focused on the optical recording medium.

Since the diffraction element 4 can have the diffraction efficiency thereof varied depending upon whether the transducer 42 is oscillating or not, the variation of the diffraction efficiency of the diffraction element 4 can be applied to the variation of light intensity depending upon whether light is a reading or recording one.

Figure 5:
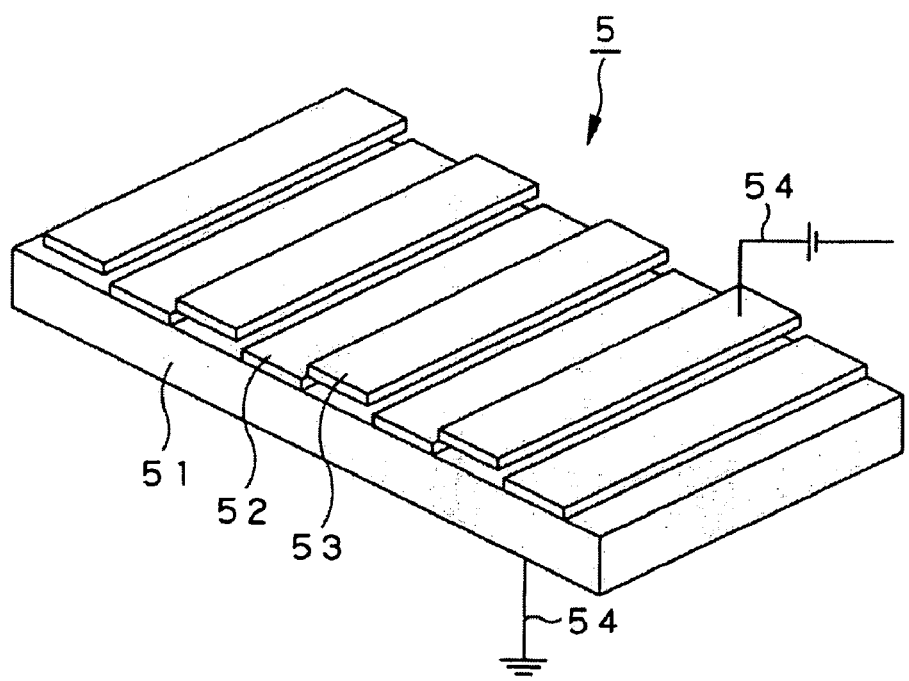
FIG. 5 illustrates a diffraction element using optical ribbons.

Next, a still another diffraction element will be described with reference to FIG. 5. The diffraction element, generally indicated with a reference 5, is a phase-modulated type diffraction grating such as GLV (grating light valve). As shown in FIG. 5, the diffraction element 5 includes stationary optical ribbons 52 fixed to a substrate 51 and movable optical ribbons 53 floating on the substrate 51, the optical ribbons 52 and 53 being disposed alternately. Each of the movable optical ribbons 53 and substrate 51 has an electrode 54 provided thereon. The movable optical ribbon 53 is movable toward or away from the substrate 51 due to a change in capacitance of the electrodes 54 provided on the substrate 51 and movable optical ribbon 53 to be opposite to each other. The distance between the movable optical ribbon 53 and substrate 51 is variable with reference to the wavelength of the laser light. Light reflected at the surface of the movable optical ribbon 53 and that reflected at the surface of the stationary optical ribbon 52 have a phase difference between them to provide a light diffraction.

Figure 6:
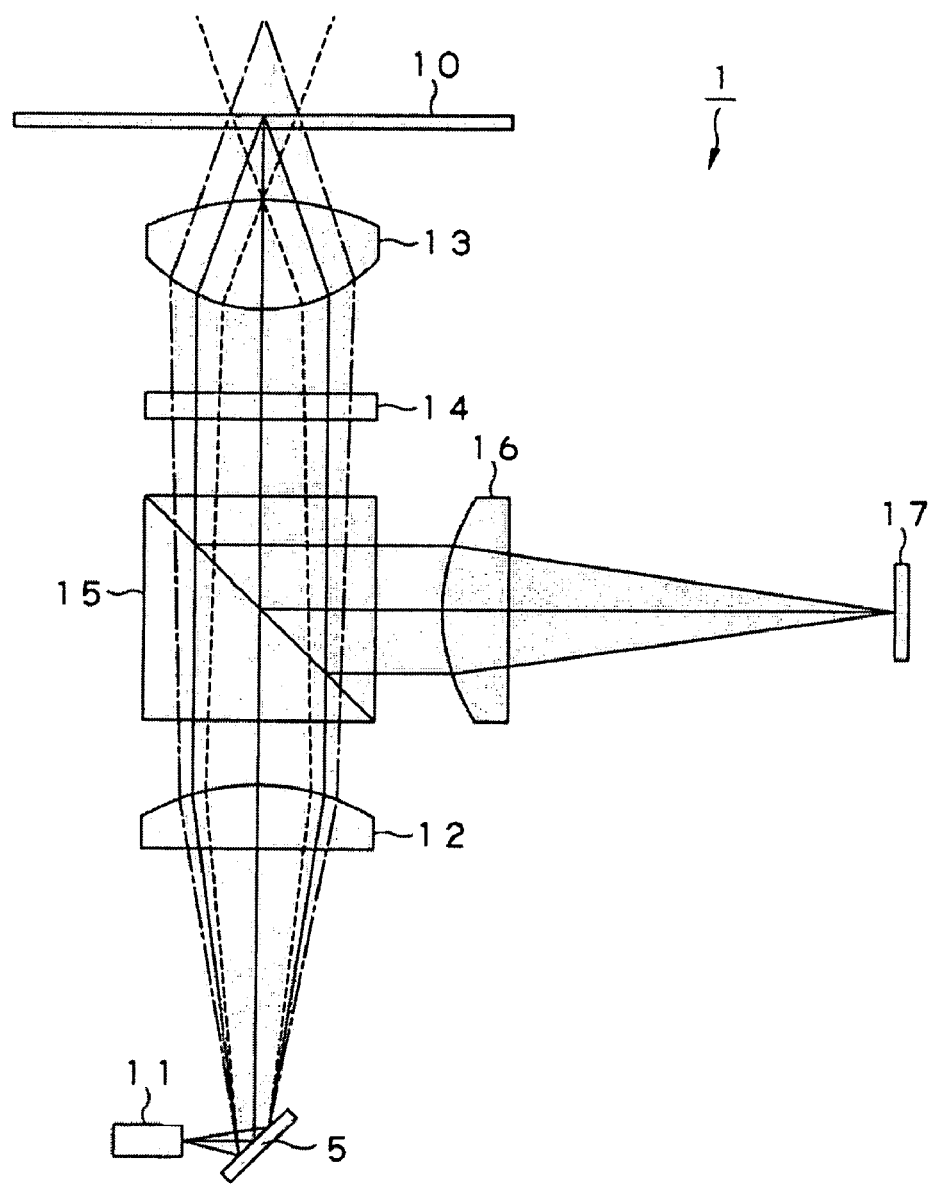
FIG. 6 schematically illustrates the optical system of an optical pickup device using a reflective diffraction element.

The diffraction element 5 is of a reflective type. FIG. 6 schematically illustrates an optical system using the reflective diffraction element 5. It should be noted that in FIG. 6, the same or similar elements as or to those in FIG. 2 are indicated with the same or similar references as or to those in FIG. 2. As shown, the diffraction element 5 is disposed between the semiconductor laser 11 and collimator lens 12, and forms a predetermined angle with a direction perpendicular to the optical recording medium 10 to reflect the light emitted from the semiconductor laser 11 in the direction of the collimator lens 12. The light passing through the collimator lens 12 illuminates the optical recording medium 10 as in the optical system shown in FIG. 2, and return light from the optical recording medium 10 is detected by the photodetector 17.

Note that when the diffraction element 5 provides no diffracted light, all the light emitted from the semiconductor laser 11 are converged on the focus of the objective lens 13 and that when the diffraction element 5 provides diffracted light, only zero-order light will be focused on the optical recording medium. Thus, the diffraction element 5 adjust the intensity of the light converged on the focus of the objective lens 13.

Note that the narrower the optical ribbon, the higher the diffraction efficiency of the diffraction element 5 will be. With the current techniques, however, it is difficult to reduce the width of the optical ribbon excessively. Since the optical ribbon of the diffraction element 5 is 8 μm or less in width and the distance between the movable optical ribbon 53 and substrate 51 is on the order of 0.5 μm, it is difficult to attain a high diffraction angle. However, since the present invention aims at reducing, by the diffraction, the power of a laser light given to the optical recording medium, even the current GLV (grating light valve) will attain the intended purpose satisfactorily. The diffraction element 5 needs a bias voltage of several volts to ten-odd volts for varying the diffraction efficiency. That is, the diffraction element 5 can be driven with a less power consumption than the other diffraction elements.

Figure 7A:
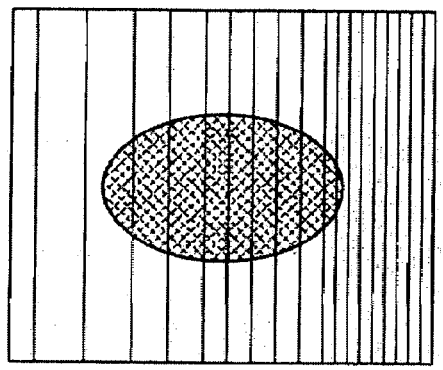
FIGS. 7A to 7D illustrate patterns of the diffraction element.

Next, the patterns of the transparent electrode 32 provided on the aforementioned diffraction element 3 will be explained. The patterns of the transparent electrode 32 are as shown in FIGS. 7A to 7D, for example. FIG. 7A shows an example of the pattern intended to focus the diffracted light in a position shifted in relation to that of the zero-order light. In this pattern, parallel transparent electrodes 32 are provided on the transparent optical material 31 and the interval between the adjacent transparent electrodes 32 is little by little smaller in a direction from one side toward the other side of the transparent optical material 31. Other diffracted light than the zero-order light and going out from the diffraction element 3 is focused in a position shifted from the focus of the zero-order light in one axial direction.

Figure 7B:
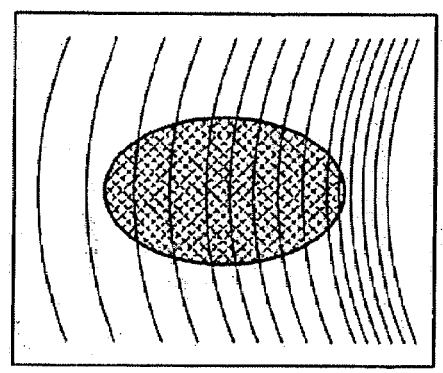

FIG. 7B shows also an example of the pattern intended to shift the focus of the diffracted light in relation to that of the zero-order light. In this pattern, the transparent optical material 31 has provided thereon transparent electrodes 32 having a predetermined curvature and the interval between the adjacent transparent electrodes 32 is little by little smaller in a direction from one side toward the other side of the transparent optical material 31. Other diffracted light than the zero-order light and going out from the diffraction element 3 is focused in a position shifted from the focus of the zero-order light in the optical-axial direction.

Figure 7C:
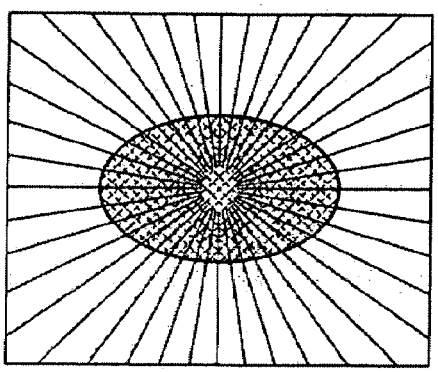

FIG. 7C shows an example of the pattern intended to diverge the diffracted light. In this pattern, the transparent electrodes 32 are provided radially from the center of optical axis of the laser light. The transparent electrodes 32 are not provided near the center of optical axis and the radiant rays of light are diverged radially in a position a predetermined distance from the center of optical axis. The diffraction element 3 formed to have this pattern diverges the diffracted light to reduce the amount of other diffracted light coming to the focus of the zero-order light.

Figure 7D:
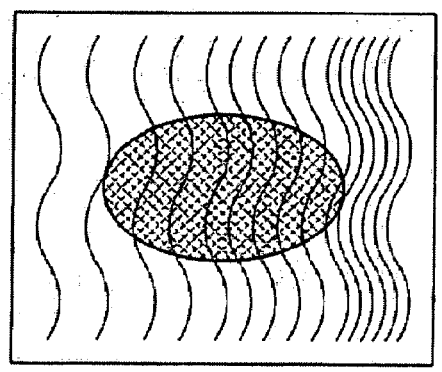

FIG. 7D also shows an example of the pattern intended to diverge the diffracted light. In this pattern, the transparent optical material 31 has wave-shaped transparent electrodes 32 formed in parallel thereon. The interval between the adjacent transparent electrodes 32 is little by little smaller in a direction from one side toward the other side of the transparent optical material 31. Thus, the diffraction element 3 diverges the diffracted light to reduce the amount of other diffracted light coming to the focus of the zero-order light.

Note here that the aforementioned patterns are applicable to the diffraction element 3 and to the other diffraction elements 4 and 5 as well. For forming one of such patterns in the diffraction element 4, a pressure antinode or node should be brought into being in a position corresponding to the aforementioned transparent electrode 32. For forming the pattern in the diffraction element 5, a movable or stationary optical ribbon should be disposed in a position corresponding to the transparent electrode 32. Any curved pattern is difficult to form in the diffraction element 5. A pattern that may be formed suitably in the diffraction element 5 is either the pattern shown in FIG. 7A or 7C. The pattern shown in 7B, having a constant grating interval and which shifts the focus in one axial direction, is suitable for the diffraction element 4.

As above, the optical pickup device 1 according to the present invention has the diffraction element provided in the light path along which light is irradiated to the optical recording medium 10 to reduce the amount of light converged on the focus of the zero-order light by diffracting unnecessary light in such a manner that the diffracted light will not be focused on the optical recording medium 10. The diffraction efficiency of the diffraction element is variable and thus the intensity of light incident upon the optical recording medium 10 can be varied depending upon whether signals are to be written or read.

Also, in the optical pickup device 1, the intensity of light irradiated to the optical recording medium can be varied depending upon the type of the optical recording medium such as a multilayer type, multi-step double speed type, etc.

According to the present invention, the diffraction element can be inserted in divergent or convergent light and thus no collimator is required. Disposing the diffraction element near the semiconductor laser allows a smaller design of the diffraction element.

Also according to the present invention, using an acousto-optical element with a transducer as the transparent optical material of the diffraction element makes it unnecessary to make the diffraction element having a fine grating, which will facilitate to make the diffraction element.

Further, according to the present invention, a phase-modulated type diffraction grating may be used as the diffraction element. In this case, the diffraction element can be used also as a bent mirror of the optical pickup, thus reducing the number of parts. Also, a photodetector may be provided on the substrate of the optical ribbon and used as a detector for optical output of the semiconductor laser.

Figure 8:
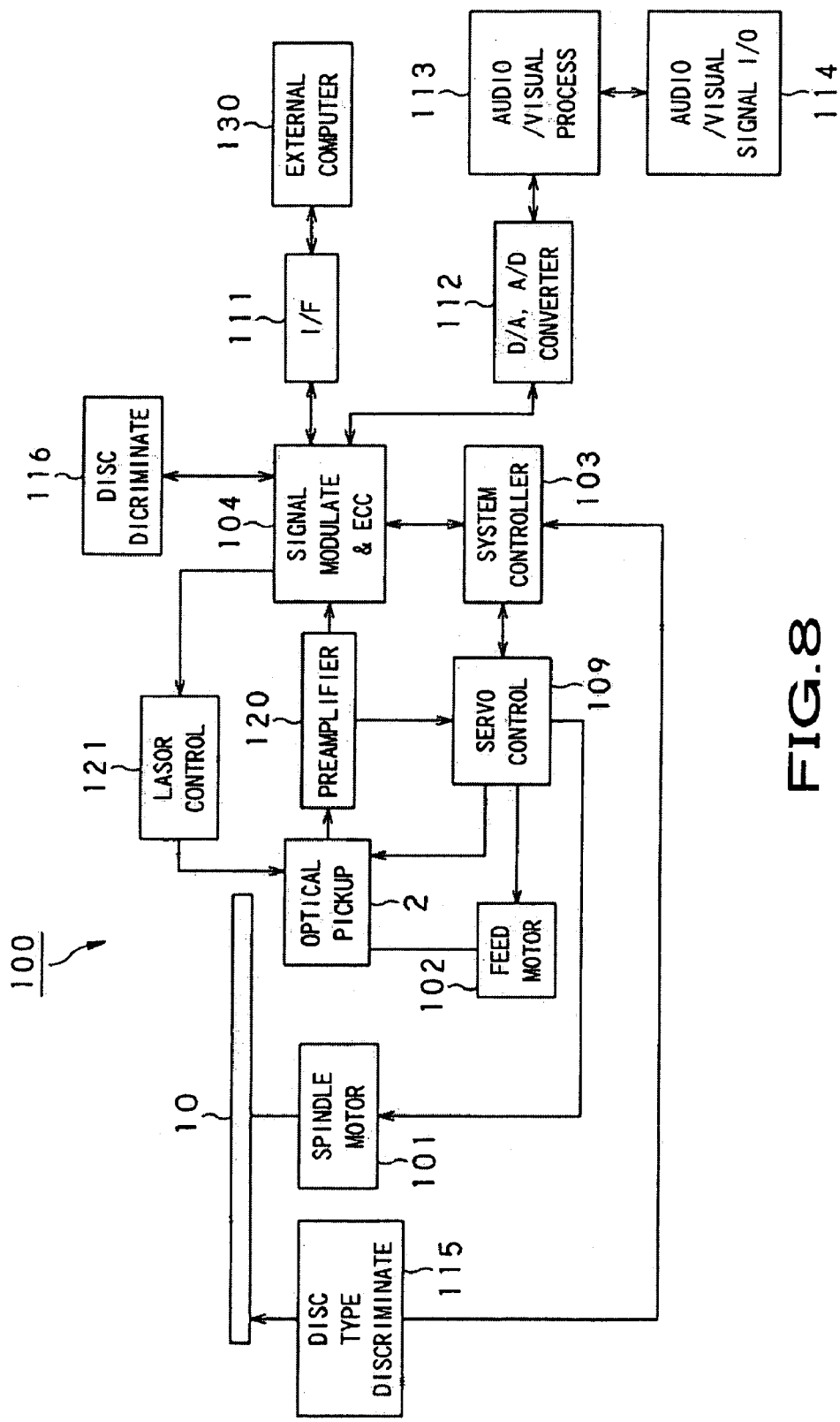
FIG. 8 is a block diagram of the optical disk drive according to the present invention.

Next, an optical disk drive using the aforementioned optical pickup device 1 will be described with reference to FIG. 8. As shown, the optical disk drive, generally indicated with a reference 100, includes a spindle motor 101 as a driving means for rotating the optical recording medium 10, optical pickup device 1 according to the present invention, and a feed motor 102 as a driving means for the optical pickup device 1. The spindle motor 101 is driven and controlled by a system controller 103 as a disk type discriminating means and a servo controller 105. The spindle motor 101 is driven at a predetermined speed.

The optical recording media 10 compatible with this optical disk drive 1 include various types of optical disks that record and read signals by different techniques using the optical modulation, such as "magneto-optical recording", "phase-change recording", "dye recording", etc. More specifically, the optical disks include "CD-R/W", "DVD-RAM", "DVD-R/RW", "DVD+RW", "Blue-ray Disk" and various magneto-optical recording media. Also, the optical recording medium 10 may be an optical disk whose recording layer is divided in two or more recording areas different in optimum writing and/or reading light power from each other or an optical disk having a plurality of recording layers laminated one on the other with a transparent substrate laid between them.

The difference in optimum writing and/or reading light power from one recording layer to the other may be caused by the recording technique itself adopted in an optical disk and also by a difference in rotating velocity (linear velocity in relation to the optical head) from one optical disk to the other (optical disks having speeds n times higher than a so-called standard-speed disk).

Also, the optical recording medium 10 may be a multilayer optical disk having at least two recording layers different in optimum writing and/or reading optical power from each other or identical in the optical power to each other. In this case, the multilayer optical disk is designed for the recording layers to be different in optimum writing and/or reading optical power from each other.

The optical pickup device 1 irradiates a light beam to the recording layer of the optical recording medium 10 and detects a return portion of the light beam from the recording layer. Also, the optical pickup device 1 detects various light beams, which will be described in detail later, on the basis of the return light from the recording layer of the optical recording medium 10, and supplies signals corresponding to the light beams to a preamplifier 120. The optical pickup device 1 has the optical system having already been described with reference to FIG. 2.

The output from the preamplifier 120 is passed to a signal modulation/ECC block 104 where the signal will be modulated and demodulated and have an ECC (error correction code) added thereto. The optical pickup device 1 irradiates light to the recording layer of the rotating optical recording medium 10 according to a command given by the signal modulation/ECC block 104 to write or read the signal to or from the optical recording medium 10.

The preamplifier 120 is designed to generate a focus error signal, tracking error signal, RF signal, etc. on the basis of a signal corresponding to each light beam. Correspondingly to the type of an optical recording medium to or from which signals are to be written or read, the signals are demodulated and error-corrected by the servo controller 105, signal modulation/ECC block 104, etc.

In case the optical recording medium 10 is a data storage for a computer, for example, the demodulated recorded signals are sent to an external computer 130 etc. via an interface 111. The external computer 130 etc. can receive the signals recorded in the optical recording medium 10 as read signals.

Also, in case the optical recording medium 10 is a so-called "audio/visual" disk, the signals are converted from digital to analog by a D-A conversion block of a D-A/A-D converter 112 and supplied to an audio/visual processor 113 in which the signals will be processed to be audio and video signals. These audio and video signals are transmitted to an external video display apparatus via an audio/visual signal input/output block 114.

The optical pickup device 1 is moved by the feed motor 102 to a predetermined recording track on the optical recording medium 10. The spindle motor 101 and feed motor 102 are controlled by the servo controller 105 which also controls a biaxial actuator to move an objective lens as a light focusing means in the optical pickup device 1 in the focusing and tracking directions.

The servo controller 105 actuates an optical coupling efficiency varying element disposed in the optical pickup device 1 to vary the efficiency of optical coupling in the optical pickup device 1, and controls it to vary the efficiency of optical coupling, that is, a ratio between the total amount of a light beam emitted from a laser light source such as a semiconductor laser or the like and an amount of light focused on the optical recording medium 10, depending upon whether signals are to be written or read or upon the type of the optical recording medium 10.

A laser controller 121 is also provided in the optical disk drive 100 to control the laser light source in the optical pickup device 1. Especially in this embodiment, the laser controller 121 controls the laser light source to vary the output power depending upon whether signals are to be written or read or upon the type of the optical recording medium 10.

Also, in case the optical recording medium 10 is an optical disk selected from at least two types of optical disks different in optimum writing and/or reading optical power for the recording layer from each other (optical disks different in recording method from each other, optical disks different in relative linear velocity relative to a light beam from each other depending upon either of divided recording areas or either of laminated recording layers, etc.), a disk type discriminating sensor 115 in the laser controller 121 discriminates the type of an optical recording medium 10 used. The optical recording media 10 includes optical disks based on different techniques using the recording by optical modulation and magneto-optical recording media, including recording media different in optimum writing and/or reading optical power for recording layer from each other. The disk type discriminating sensor 115 can detect a surface reflectance of the optical recording medium 10 and other differences in shape and outline, etc.

The system controller 103 discriminates the type of the optical recording medium 10 on the basis of the result of discrimination sent from the disk type discriminating sensor 115. One of the techniques for discrimination of the optical recording medium type is as follows. For example, in case the optical recording medium is an optical disk encased in a cartridge, a detection hole is formed in the cartridge to discriminate the type of the optical recording medium.

Alternatively, "disk type" or "recommendable writing optical power and reading optical power" is detected based on TOC (table of contents: TOC) information recorded at pre-mastered pits, grooves or the like formed along the innermost circumference of the optical recording medium and there are set a writing power and reading power suitable for writing to and reading from the optical recording medium.

The servo controller 105 as the optical coupling efficiency control means is controlled by the system controller 103 to control the efficiency of optical coupling in the optical pickup device 1 according to the result of discrimination from the disk type discriminating sensor 115.

In case the optical recording medium 10 is an optical disk having a recording layer divided into at least two recording areas different in optimum writing and/or reading optical power from each other, a recording area to or from which signals are to be written or read is detected by a recording area discriminating means.

In case the recording layer of the optical recording medium 10 is divided into a plurality of recording areas concentric with the center thereof, the servo controller 105 can be used as the recording area discriminating means. The servo controller 105 can discriminate a recording area to or from which signals are to be written or read by detecting a position of the optical pickup device 1 in relation to the optical recording medium 10 (or by detecting such a position on the basis of an address signal recorded in the optical recording medium 10), for example, and control the efficiency of optical coupling in the optical pickup device 1 according to the result of discrimination of a recording area to or from which signals are to be written or read.

In case the optical recording medium 10 is a multilayer optical disk having at least two recording layers different in optimum writing and/or reading optical power from each other, the recording layer discriminating means discriminates a recording layer to or from which signals are to be written or read. The recording layer discrimination may be done by the servo controller 105. The servo controller 105 can discriminate a recording area to or from which signals are to be written or read by detecting a position of the optical pickup device 1 in relation to the optical recording medium 10, for example, and control the efficiency of optical coupling in the optical pickup device 1 according to the result of discrimination of a recording area to or from which signals are to be written or read.

Note that information on the optical disk type, recording area and recording layer can also be discriminated by reading the so-called TOC information recorded in each optical disk.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As the present invention has been described in the foregoing, the efficiency of light utilization in the optical pickup device can be varied by making optical modulation of the diffraction efficiency and preventing the diffracted light from being focused on the optical recording medium by means of the diffraction means. Thus, the efficiency of light utilization can be varied depending upon whether signals are to be written or read. Also, the efficiency of light utilization can be varied depending upon the type of an optical recording medium used. Adjusting the optical output by a combination of the diffraction element and light source permits to reduce the optical output of the light source, which leads to an improved reliability of the light source. Also, the light source consumes less power and dissipates less heat.

Also, according to the present invention, the diffracted light is prevented from being focused on the optical recording medium by shifting the focus of the diffracted light in relation to the zero-order light, to thereby attenuate the zero-order light without having to shield the diffracted light. Thus, the grating interval of the diffraction means has not to be set smaller for a larger diffraction angle, and the diffraction element can be produced more easily. Also, the distance between the diffraction means and light shield may not be large, which leads to a more compact design of the optical pickup device.

Further, since the diffracted light from the diffraction means spreads sufficiently over the optical recording medium and has a sufficiently low optical density, the signals recorded in the optical recording medium cannot be erased even if the diffracted light is larger in intensity than the zero-order light. Also, since the reflected portion of the diffracted light is sufficiently small in optical density, it will not have any influence on read and servo signals.

What is claimed is:

1. An optical pickup device comprising:
   a light source that irradiates light to an optical recording medium;
   a focusing unit configured to focus the light emitted from the light source on the optical recording medium;
   a recording area discrimination unit configured to detect a portion of the optical recording medium the light is focused on;
   a diffraction unit provided between the light source and focusing unit and configured to diffract the light emitted from the light source so that zero-order light resulted from the diffraction is focused by the focusing unit on the optical recording medium while other diffracted light than the zero-order light goes to a focus shifted in an optical-axial direction not to be focused on the optical recording medium, the diffraction unit configured to vary a diffraction efficiency of the light based on the portion of the optical recording medium detected by the recording area discrimination unit; and
   a light detecting unit configured to detect a portion reflected from the optical recording medium, of the zero-order light from the diffraction unit.

2. The optical pickup device according to claim 1, wherein the diffraction unit is configured to vary an efficiency of light utilization depending upon whether signals are to be written to the optical recording medium or read from the optical recording medium.

3. The optical pickup device according to claim 1, wherein the diffraction unit is configured to vary an efficiency of light utilization depending upon the type of the optical recording medium.

4. The optical pickup device according to claim 1, wherein the diffraction unit is disposed near the light source; and divergent light emitted from the light source is incident upon the diffraction unit.

5. The optical pickup device according to claim 1, wherein the diffraction unit is formed from a transparent optical material with transparent electrodes, the transparent optical material having the birefringence thereof varied when a voltage is applied across the transparent electrodes, to thereby optically modulate of the diffraction efficiency.

6. The optical pickup device according to claim 1, wherein the diffraction unit is configured to use an acousto-optical element formed from a transparent optical material with an oscillating unit, the transparent optical material having the birefringence thereof varied when the oscillating unit generates ultrasound, to thereby optically modulate the diffraction efficiency.

7. The optical pickup device according to claim 1, wherein the diffraction unit is a phase-modulated type diffraction grating.

8. An optical disk drive that writes signals to an optical recording medium and/or reads signals recorded in the optical recording medium, the apparatus comprising:
   a light source that irradiates light to an optical recording medium;
   a focusing means for focusing the light emitted from the light source on the optical recording medium;
   a diffraction means provided between the light source and focusing means to diffract the light emitted from the light source so that zero-order light resulted from the diffraction is focused by the focusing means on the optical recording medium while other diffracted light than the zero-order light goes to a focus shifted in an optical-axial direction not to be focused on the optical recording medium;

a light detecting means for detecting a portion, reflected from the optical recording medium, of the zero-order light from the diffraction means; and a write/read control means for controlling the output of reading or writing light from the light source and the diffraction efficiency of the diffraction means.

9. The optical disk drive according to claim 8, wherein the diffraction means varies the efficiency of light utilization depending upon whether signals are to be written to the optical recording medium or read from the optical recording medium.

10. The optical disk drive according to claim 8, wherein the diffraction means varies the efficiency of light utilization depending upon the type of the optical recording medium.

11. The optical disk drive according to claim 8, wherein: the diffraction means is disposed near the light source; and divergent light emitted from the light source is incident upon the diffraction means.

12. The optical disk drive according to claim 8, wherein the diffraction means is formed from a transparent optical material with transparent electrodes, the transparent optical material having the birefringence thereof varied when a voltage is applied across the transparent electrodes, to thereby optically modulate of the diffraction efficiency.

13. The optical disk drive according to claim 8, wherein the diffraction means uses an acousto-optical element formed from a transparent optical material with an oscillating means, the transparent optical material having the birefringence thereof varied when the oscillating means generates ultrasound, to thereby optically modulate of the diffraction efficiency.

14. The optical disk drive according to claim 8, wherein the diffraction means is a phase-modulated type diffraction grating.

15. An optical disk drive that writes signals to an optical recording medium and/or reads signals recorded in the optical recording medium, the apparatus comprising:

a light source configured to irradiate light to an optical recording medium;

a focusing unit configured to focus the light emitted from the light source on the optical recording medium;

a diffraction unit provided between the light source and focusing unit and configured to diffract the light emitted from the light source so that zero-order light resulted from the diffraction is focused by the focusing unit on the optical recording medium while other diffracted light than the zero-order light goes to a focus shifted in an optical-axial direction not to be focused on the optical recording medium;

a light detecting unit configured to detect a portion, reflected from the optical recording medium, of the zero-order light from the diffraction unit; and a write/read control unit configured to control the output of reading or writing light from the light source and the diffraction efficiency of the diffraction unit.

16. The optical disk drive according to claim 15, wherein the diffraction unit is configured to vary the efficiency of light utilization depending upon whether signals are to be written to the optical recording medium or read from the optical recording medium.

17. The optical disk drive according to claim 15, wherein the diffraction unit is configured to vary the efficiency of light utilization depending upon the type of the optical recording medium.

18. The optical disk drive according to claim 15, wherein the diffraction unit is disposed near the light source; and divergent light emitted from the light source is incident upon the diffraction unit.

19. The optical disk drive according to claim 15, wherein the diffraction unit is formed from a transparent optical material with transparent electrodes, the transparent optical material having the birefringence thereof varied when a voltage is applied across the transparent electrodes, to thereby optically modulate the diffraction efficiency.

20. The optical disk drive according to claim 15, wherein the diffraction unit is configured to use an acousto-optical element formed from a transparent optical material with an oscillating unit, the transparent optical material having the birefringence thereof varied when the oscillating unit generates ultrasound, to thereby optically modulate the diffraction efficiency.

21. The optical disk drive according to claim 15, wherein the diffraction unit is a phase-modulated type diffraction grating.

22. An optical pickup device comprising:

a light source that irradiates light to an optical recording medium;

a focusing unit configured to focus the light emitted from the light source on the optical recording medium;

a diffraction unit provided between the light source and focusing unit and configured to diffract the light emitted from the light source so that zero-order light resulted from the diffraction is focused by the focusing unit on the optical recording medium while other diffracted light than the zero-order light goes to a focus shifted in an optical-axial direction not to be focused on the optical recording medium, the diffraction unit configured to use an acousto-optical element formed from a transparent optical material with an oscillating unit, the transparent optical material having the birefringence thereof varied when the oscillating unit generates ultrasound to thereby optically modulate the diffraction efficiency; and a light detecting unit configured to detect a portion, reflected from the optical recording medium, of the zero-order light from the diffraction unit.

23. An optical pickup device comprising:

a light source that irradiates light to an optical recording medium;

a focusing unit configured to focus the light emitted from the light source on the optical recording medium;

a recording area discrimination unit configured to detect a portion of the optical recording medium the light is focused on;

a diffraction unit provided between the light source and focusing unit and configured to diffract the light emitted from the light source so that zero-order light resulted from the diffraction is focused by the focusing unit on the optical recording medium while other diffracted light than the zero-order light goes to a focus shifted in an optical-axial direction not to be focused on the optical recording medium, the diffraction unit being a phase-modulated type diffraction grating and being controlled based on the portion detected by the recording area discrimination unit; and a light detecting unit configured to detect a portion, reflected from the optical recording medium, of the zero-order light from the diffraction unit.

* * * * *

UNITED STATES PATENT AND TRADEMARK OFFICE
CERTIFICATE OF CORRECTION

| | |
|---|---|
| PATENT NO. | : 7,327,662 B2 |
| APPLICATION NO. | : 10/807241 |
| DATED | : February 5, 2008 |
| INVENTOR(S) | : Takashi Kobayashi et al. |

It is certified that error appears in the above-identified patent and that said Letters Patent is hereby corrected as shown below:

Column 2, line 50, delete "2002-40784" and insert --2002-90784--.

Signed and Sealed this

Twelfth Day of August, 2008

JON W. DUDAS
*Director of the United States Patent and Trademark Office*